(12) United States Patent
Yang et al.

(10) Patent No.: US 9,381,491 B2
(45) Date of Patent: Jul. 5, 2016

(54) CERAMIC MATERIAL, METHOD FOR ADSORBING CARBON DIOXIDE AND METHOD FOR CONVERTING CARBON DIOXIDE

(71) Applicant: National Taiwan University of Science and Technology, Taipei (TW)

(72) Inventors: Sheng-Chiang Yang, Taichung (TW); Wei-Nien Su, Taipei (TW); Bing-Joe Hwang, Taipei (TW)

(73) Assignee: National Taiwan University of Sciences and Technology, Taipei (TW)

( * ) Notice: Subject to any disclaimer, the term of this patent is extended or adjusted under 35 U.S.C. 154(b) by 527 days.

(21) Appl. No.: 13/742,371

(22) Filed: Jan. 16, 2013

(65) Prior Publication Data

US 2014/0100296 A1 Apr. 10, 2014

(30) Foreign Application Priority Data

Oct. 9, 2012 (TW) .............................. 101137331 A

(51) Int. Cl.
*B01J 20/00* (2006.01)
*B01J 20/06* (2006.01)
(Continued)

(52) U.S. Cl.
CPC ................. *B01J 20/06* (2013.01); *B01D 53/02* (2013.01); *B01D 53/62* (2013.01); *B01D 53/82* (2013.01); *B01J 20/28057* (2013.01); *B01J 20/305* (2013.01); *B01J 20/3078* (2013.01); *C01B 31/18* (2013.01); *C01F 17/0043* (2013.01); *C01G 1/02* (2013.01); *C04B 35/50* (2013.01); *C10G 2/30* (2013.01); *B01D 2253/1124* (2013.01);
(Continued)

(58) Field of Classification Search
CPC ........... B01D 2253/1124; B01D 53/04; B01D 53/62; Y02C 10/08; Y02C 10/04; C04B 2235/3229
USPC ............................. 502/400; 518/722; 95/139
See application file for complete search history.

(56) References Cited

U.S. PATENT DOCUMENTS

| 2010/0139486 A1 | 6/2010 | Smirniotis et al. |
| 2012/0159841 A1 | 6/2012 | Fan et al. |
| 2012/0174482 A1 | 7/2012 | Atanackovic et al. |

FOREIGN PATENT DOCUMENTS

| CN | 1784268 | 6/2006 |
| CN | 101279206 | 10/2008 |

(Continued)

OTHER PUBLICATIONS

Yahiro et al., "Oxygen ion conductivity of the ceria-samarium oxide system with fluorite structure", Journal of Applied Electrochemistry, vol. 18, Issue 4, Jul. 1, 1988, pp. 527-531.

(Continued)

*Primary Examiner* — Jafar Parsa
(74) *Attorney, Agent, or Firm* — Jianq Chyun IP Office

(57) ABSTRACT

A ceramic material, methods for adsorbing and converting carbon dioxide are provided. The ceramic material is represented by a chemical formula $M_{1x}M_{2y}O_z$, wherein $M_1$ is selected from a group consisting of Nd, Sm, Gd, Yb, Sc, Y, La, Ac, Al, Ga, In, Tl, V, Nb, Ta, Fe, Co, Ni, Cu, Ca, Sr, Na, Li and K; $M_2$ is selected from a group consisting of Ce, Zn, Ti, Zr and Si; O represents oxygen atom; $x<0.5$, $y>0.5$, $x+y=1.0$, $z<2.0$; and the ceramic material has an adsorption capacity of not less than 20 μmol/g for $CO_2$ at 50° C.

3 Claims, 7 Drawing Sheets

(51) Int. Cl.
*C01B 31/18* (2006.01)
*C10G 2/00* (2006.01)
*B01J 20/30* (2006.01)
*B01D 53/62* (2006.01)
*C04B 35/50* (2006.01)
*B01J 20/28* (2006.01)
*B01D 53/02* (2006.01)
*B01D 53/82* (2006.01)
*C01F 17/00* (2006.01)
*C01G 1/02* (2006.01)

(52) U.S. Cl.
CPC ..... *B01D2253/306* (2013.01); *B01D 2257/504* (2013.01); *C01P 2002/50* (2013.01); *C01P 2004/03* (2013.01); *C01P 2006/12* (2013.01); *C01P 2006/90* (2013.01); *C04B 2235/3224* (2013.01); *C04B 2235/3229* (2013.01); *Y02C 10/04* (2013.01); *Y02C 10/08* (2013.01); *Y02P 20/152* (2015.11); *Y02P 30/10* (2015.11)

(56) References Cited

FOREIGN PATENT DOCUMENTS

| | | |
|---|---|---|
| CN | 101804327 | 8/2010 |
| CN | 102597173 | 7/2012 |
| EP | 2567751 | 3/2013 |
| TW | 134530 | 5/1990 |
| TW | 404961 | 9/2000 |
| TW | 527211 | 4/2003 |
| TW | 201032893 | 9/2010 |
| TW | 201124195 | 7/2011 |
| WO | 2009144143 | 12/2009 |

OTHER PUBLICATIONS

Rossinyol et al., "Gadolinium doped Ceria nanocrystals synthesized from mesoporous silica", Journal of Nanoparticle Research, vol. 10, Issue. 2, Jul. 20, 2008, pp. 369-375.

Yang et al., "Preparation of highly dispersed catalytic Cu from rod-like Cuo-CeO2 mixed metal oxides: suitable for applications in high performance methanol steam reforming" Catalysis Science & Technology, vol. 2, No. 4, Apr. 1, 2012, pp. 807-812.

"Office Action of Taiwan Counterpart Application", issued on Jun. 12, 2014, p. 1-p. 6.

"Search Report of European Counterpart Application", issued on Feb. 3, 2014, p. 1-p. 12.

Zhu et al., "Syngas generation in a membrane reactor with a highly stable ceramic composite membrane," Catalysis Communications, Sep. 23, 2008, pp. 309-312.

"Office Action of China Counterpart Application", issued on Jun. 3, 2015, p. 1-p. 5.

CERAMIC MATERIAL, METHOD FOR ADSORBING CARBON DIOXIDE AND METHOD FOR CONVERTING CARBON DIOXIDE

CROSS-REFERENCE TO RELATED APPLICATION

This application claims the priority benefit of Taiwan application serial no. 101137331, filed on Oct. 9, 2012. The entirety of the above-mentioned patent application is hereby incorporated by reference herein and made a part of this specification.

BACKGROUND OF THE INVENTION

1. Field of the Invention

The invention relates to a material for processing carbon dioxide and method thereof. More particularly, to a method for adsorbing and/or converting carbon dioxide using a ceramic material.

2. Description of Related Art

In recent years, global warming has become a major issue which is highly concerned by the entire world. Climate anomalies, species extinction and other phenomena caused by global warming are all related closely to the life quality of human beings. Excessive greenhouse gases contained in the atmosphere have been identified as one of the major factors causing the global warming issue. Ever since the industrial revolution, fossil fuels are extensively used by human beings in response to the needs of economic development, and carbon dioxide content in the atmosphere is significantly increased, accordingly. Carbon dioxide entering the atmosphere is almost impossible to recycle, such that the global warming problem is getting worse day by day.

Therefore, how to reduce carbon dioxide content in the atmosphere in order to alleviate global warming has become an important research direction. In many scientific studies, various methods for capturing carbon dioxide have also been proposed. For instance, chemical absorbents, physical absorbents or cryocondensation technology may be used to capture carbon dioxide in exhaust air or the atmosphere and sequestrate the carbon dioxide in the ocean, oil fields or underground rocks. By doing so, anthropogenic emission of carbon dioxide to the atmosphere may be reduced and deterioration of greenhouse effect may also be slowed down, accordingly. However, the method for sequestrating carbon dioxide in the ocean, oil fields or underground rocks is not a perfect solution since it may cause other ecological problems while having higher requirements in both costs and technology. Moreover, since industrial usage of carbon dioxide is quite limited in the present days, developments of new processes are still required for further utilizing carbon dioxide being sequestrated. Therefore, it is generally expected to develop a technology for effectively capturing, converting and utilizing carbon dioxide, so as to alleviate global warming caused by greenhouse effect while increasing the economic benefits.

SUMMARY OF THE INVENTION

In the field of ceramic materials, as long as the temperature reaches a solid solution temperature, a new ceramic can be formed by uniformly mixing two or more metal oxides. A ceramic material is provided. The ceramic material may be represented by a chemical formula $M_{1x}M_{2y}O_z$, in which $M_1$ is selected from a group consisting of Nd, Sm, Gd, Yb, Sc, Y, La, Ac, Al, Ga, In, Tl, V, Nb, Ta, Fe, Co, Ni, Cu, Ca, Sr, Na, Li and K; $M_2$ is selected from a group consisting of Ce, Zn, Ti, Zr and Si; O represents oxygen atom; $x<0.5$, $y>0.5$, $x+y=1.0$, $z<2.0$; and the ceramic material has an adsorption capacity of not less than 20 μmol/g for $CO_2$ at 50° C.

According to an embodiment of the invention, the ceramic material may be a solid solution and an adsorption capacity for $CO_2$ at 50° C. is 20 to 99.1 μmol/g, while the ceramic material may have a specific surface area of 5 to 118 m$^2$/g.

A method for adsorbing carbon dioxide is provided, said method includes providing a ceramic material and performing a temperature control process on the ceramic material. The ceramic material is represented by a chemical formula $M_{1x}M_{2y}O_z$, in which $M_1$ is selected from a group consisting of Nd, Sm, Gd, Yb, Sc, Y, La, Ac, Al, Ga, In, Tl, V, Nb, Ta, Fe, Co, Ni, Cu, Ca, Sr, Na, Li and K; $M_2$ is selected from a group consisting of Ce, Zn, Ti, Zr and Si; O represents oxygen atom; $x<0.5$, $y>0.5$, $x+y=1.0$, $z<2.0$; and adsorbing carbon dioxide with the ceramic material during the temperature control process.

In the method for adsorbing carbon dioxide according to an embodiment of the invention, the ceramic material is formed by using a space-confined method to increase oxygen vacancies in the ceramic material.

In the method for adsorbing carbon dioxide according to an embodiment of the invention, a specific surface area of the ceramic material may be 5 to 118 m$^2$/g.

In the method for adsorbing carbon dioxide according to an embodiment of the invention, the ceramic material is further processed by using a thermal reduction method to increase oxygen vacancies in the ceramic material.

In the method for adsorbing carbon dioxide according to an embodiment of the invention, during the temperature control process, a temperature is controlled in a range of 300° C. to 1000° C. Meanwhile, the temperature may be controlled in a range of 0° C. to 300° C. before the temperature is controlled in the range of 300° C. to 1000° C.

According to an embodiment of the invention, the method for adsorbing carbon dioxide may further include a step of converting carbon dioxide adsorbed by the ceramic material into carbon monoxide.

According to an embodiment of the invention, the method for adsorbing carbon dioxide may further include a step of performing a thermal reduction method to recover oxygen vacancies in the ceramic material after converting carbon dioxide adsorbed by the ceramic material into carbon monoxide.

According to an embodiment of the invention, the method for adsorbing carbon dioxide may further include a step of performing a thermal reduction method to recover oxygen vacancies in the ceramic material after converting carbon dioxide adsorbed by the ceramic material into carbon monoxide.

According to an embodiment of the invention, the method for adsorbing carbon dioxide further includes a step of preparing a liquid fuel by utilizing carbon monoxide obtained from converting carbon dioxide through processes such as Fischer-Tropsch process.

In view of above, by using the method for adsorbing carbon dioxide as proposed by the present disclosure, carbon dioxide may be effectively adsorbed, so as to reduce carbon dioxide in the air. Oxygen vacancies in a ceramic material may also be used for converting carbon dioxide into carbon monoxide. In addition, carbon monoxide obtained from converting carbon dioxide may be further applied in production of various chemicals by the method for converting carbon dioxide provided in the present disclosure.

To make the above features and advantages of the invention more comprehensible, several embodiments accompanied with drawings are described in detail as follows.

DESCRIPTION OF THE EMBODIMENTS

A ceramic material provided by the invention may be represented by a chemical formula $M_{1x}M_{2y}O_z$, in which $M_1$ is selected from a group consisting of Nd, Sm, Gd, Yb, Sc, Y, La, Ac, Al, Ga, In, Tl, V, Nb, Ta, Fe, Co, Ni, Cu, Ca, Sr, Na, Li and K; $M_2$ is selected from a group consisting of Ce, Zn, Ti, Zr and Si; O represents oxygen atom; and $x<0.5$, $y>0.5$, $x+y=1.0$, $z<2.0$. In addition, the ceramic material has an adsorption capacity of not less than 20 µmol/g for $CO_2$ at 50° C., and the adsorption capacity is more preferably in a range of 20 to 99.1 µmol/g.

A specific surface area of the ceramic material may be, for example, 5 to 118 $m^2$/g, and the ceramic material may be, for example, a solid solution. More specifically, the ceramic material may be, for example, an oxide formed by doping $M_1$ in $M_{2y}O_z$. Nevertheless, the invention is not limited to the embodiments set forth herein. Density of oxygen vacancies in the ceramic material may be increased by forming a metal oxide containing said dopant. Therefore, the ceramic material may have a favorable effect on adsorbing and/or converting carbon dioxide when being applied for adsorbing and/or converting of carbon dioxide.

Figure 1:
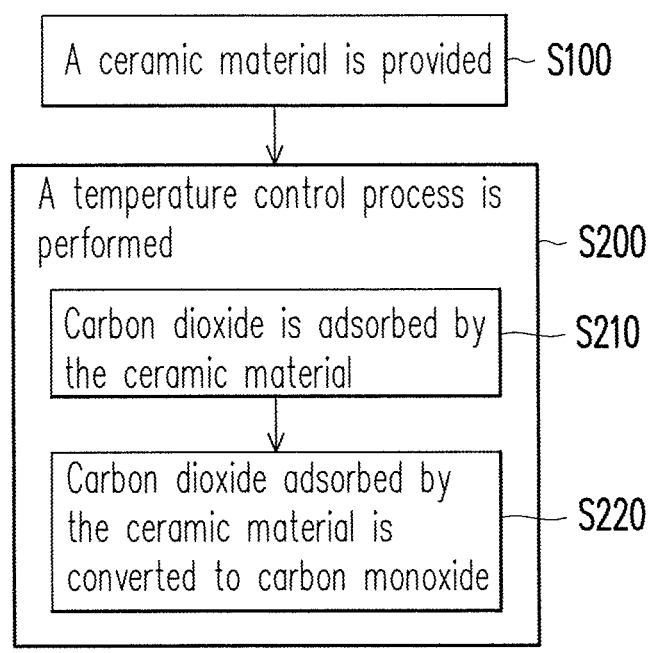
FIG. 1 is a flowchart illustrating a method for adsorbing carbon dioxide according to the invention.

FIG. 1 is a flowchart illustrating a method for adsorbing carbon dioxide according to the invention. As shown in FIG. 1, first, in step S100, the ceramic material as described above is provided. The ceramic material may be represented by the chemical formula $M_{1x}M_{2y}O_z$, in which $M_1$ is selected from the group consisting of Nd, Sm, Gd, Yb, Sc, Y, La, Ac, Al, Ga, In, Tl, V, Nb, Ta, Fe, Co, Ni, Cu, Ca, Sr, Na, Li and K; $M_2$ is selected from the group consisting of Ce, Zn, Ti, Zr and Si; O represents oxygen atom; $x<0.5$, $y>0.5$, $x+y=1.0$, $z<2.0$. The ceramic material has the adsorption capacity of not less than 20 µmol/g for $CO_2$ at 50° C., for example, in a range of 20 to 99.1 µmol/g. Specific examples of the ceramic material may be $Sm_{0.2}Ce_{0.8}O_{1.9}$, $La_{0.2}Ce_{0.5}O_{1.9}$, $Gd_{0.2}Ce_{0.8}O_{1.9}$, $Y_{0.2}Ce_{0.8}O_{1.9}$, $Nd_{0.2}Ce_{0.8}O_{1.9}$ and so on. However, the invention is not limited thereto, and any ceramic material capable of producing oxygen vacancies may be used.

The ceramic material of the invention may be formed by using a space-confined method to increase oxygen vacancies in the ceramic material. The ceramic material of the invention may be further processed by using a thermal reduction method to increase oxygen vacancies in the ceramic material. Brief descriptions to these methods are described below.

(1) Forming the Ceramic Material by Using a Space-Confined Method

The space-confined method described herein uses a mesoporous material as a template. A raw material of the ceramic material is filled into pores of the mesoporous material structure, followed by performing a sintering process under high temperature, so as to produce the ceramic material having a high specific surface area.

The mesoporous material may be, for example, a silicon-based material or a carbon-based material. Generally speaking, a high sintering process may be performed in the air when the silicon-based material is used. After the sintering process, the silicon-based material served as the template is removed by using alkali at room temperature, such that a required portion of the ceramic material is retained. In the case where the carbon-based material is used, a sintering process should be performed in an inert gas environment, followed by oxidizing the carbon-based material served as the template by introducing oxygen under high temperature, such that the removal of the template is done.

Practically, as long as the specific surface area of the ceramic material can be effectively increased, the mesoporous material served as the template is not particularly limited. For instance, a porous silicon dioxide material SBA-15 (product name) may serve as the template used in the high sintering process. SBA-15 has a high specific surface area itself, and while heating up to 1000° C., it has a stable structure and a porous property. Thus, after being used as the template for sintering, SBA-15 may then be removed by an alkaline solution (e.g., sodium hydroxide solution) to produce the ceramic material having a high specific surface area. The ceramic material having the high specific surface area comes with more oxygen vacancies, allowing the ceramic material to have a preferable capability of adsorbing carbon dioxide. Under the same sintering condition, the ceramic material formed by said space-confined method may have a 10 times to 30 times increase in the specific surface area as compared with the ceramic material formed by using a traditional sintering method (such as a direct heating method).

(2) Processing the Ceramic Material by Using a Thermal Reduction Method

The thermal reduction method may be, for example, a hydrogen reduction method, but the invention is not limited thereto. For instance, during the thermal reduction, oxygen atoms in the lattice of the ceramic material may be reacted with the introduced hydrogen, so as to further increase oxygen vacancies in the ceramic material. In addition, the lattice oxygen atoms may also be diffused or desorbed by heating the ceramic material in vacuum (or under a low pressure).

It should be noted that, above methods may be used in combination depending on the actual circumstance, and the invention is not limited to use only one method to increase oxygen vacancies. For instance, the ceramic material may be processed by using the hydrogen reduction method after ceramic material is formed by using the space-confined method, so as to increase oxygen vacancies in the ceramic material. In this way, it may also have more advantages in adsorbing carbon dioxide.

Next, in step S200, a temperature control process is performed on the ceramic material, and carbon dioxide is adsorbed by the ceramic material during the temperature control process (step S210). Oxygen vacancies in the ceramic material have been increased by methods such as increasing the specific surface area and/or hydrogen reduction; therefore, when introducing carbon dioxide to a reaction chamber where the ceramic material is placed, carbon dioxide will be adsorbed. In view of above, by using the method for adsorbing carbon dioxide as proposed by the present embodiments, carbon dioxide may be effectively adsorbed by the ceramic material, such that the concentration of carbon dioxide in air may further be reduced.

In addition, said method for adsorbing carbon dioxide may further include a step of converting carbon dioxide adsorbed by the ceramic material into carbon monoxide (step S220).

It should be noted that, a temperature range in step S200 is not particularly limited. Practically, a process temperature of step S200 may be the same or different to that used in step S100. For instance, in step S200, the ceramic material may adsorb carbon dioxide (step S210) at the same temperature as that used in the environment of step S100 without performing a heating process or a cooling process thereon. However, considering the efficiency in converting carbon dioxide, it is more preferable to control the temperature in a range of 300° C. to 1000° C. In addition, the temperature control process performed in step S200 may also be a two-stage or a multiple-stage temperature control process. For instance, adsorbing carbon dioxide may be performed at the temperature in the range of 0° C. to 300° C. (step S210), then, the temperature may be raised to a range of 300° C. to 1000° C. for converting carbon dioxide (step S220). Moreover, the temperature in the range of 0° C. to 300° C. may be, for example, a temperature the same as room temperature, which is more preferable in terms of energy saving because there is no need to conduct a heating process or a cooling process by consuming additional energy. However, the invention is not limited thereto, and the temperature may be properly selected based on actual requirements.

In addition, while performing the temperature control process (step S200), the temperature may be adjusted to a specific temperature in the range of 300° C. to 1000° C., and the adsorption of carbon dioxide (step S210) and the conversion of carbon dioxide (step S220) are concurrently performed at the specific temperature. It should be noted that, a method for adjusting the temperature as mentioned above is not particularly limited herein, and the method may be, for example, by performing a thermal process or a cooling process to reach the specific temperature which falls in said range.

At this time, a ceramic material having more oxygen vacancies has been provided in step S100, and the temperature has also been adjusted through the temperature control process to the temperature in the range which is preferable for converting carbon dioxide in step S200. Therefore, once carbon dioxide is introduced in the reaction chamber where the ceramic material is placed, the ceramic material may start to adsorb a great amount of carbon dioxide, and the carbon dioxide adsorbed by the ceramic material may immediately be converted into carbon monoxide which then is released from the ceramic material.

Then, a liquid fuel may be prepared by using carbon monoxide obtained from converting carbon dioxide. A preparing method for the liquid fuel may be, for example, Fischer-Tropsch process, which is used for combining carbon monoxide and hydrogen into compounds such as alkanes, alkenes or alcohols. Since a required temperature of Fischer-Tropsch process is approximately 300° C. or more, Fischer-Tropsch process may be easily integrated with the method for converting carbon dioxide as described above, which has advantages in actual preparing process in the industry. However, the invention is not limited thereto; said carbon monoxide prepared may also be applied to other usages well-known by person skilled in the art.

In addition, the method for adsorbing carbon dioxide may further include a step of performing a thermal reduction method to recover oxygen vacancies in the ceramic material after converting adsorbed carbon dioxide into carbon monoxide. As described above, as introduction of hydrogen gas may facilitate the diffusion or desorption of oxygen atoms in lattice of the ceramic material, and oxygen vacancies in the ceramic material may be thus recovered, such that the ceramic material could perform the adsorption and conversion of carbon dioxide again. As a result, the ceramic material can be then recycled and reused.

Figure 2A:
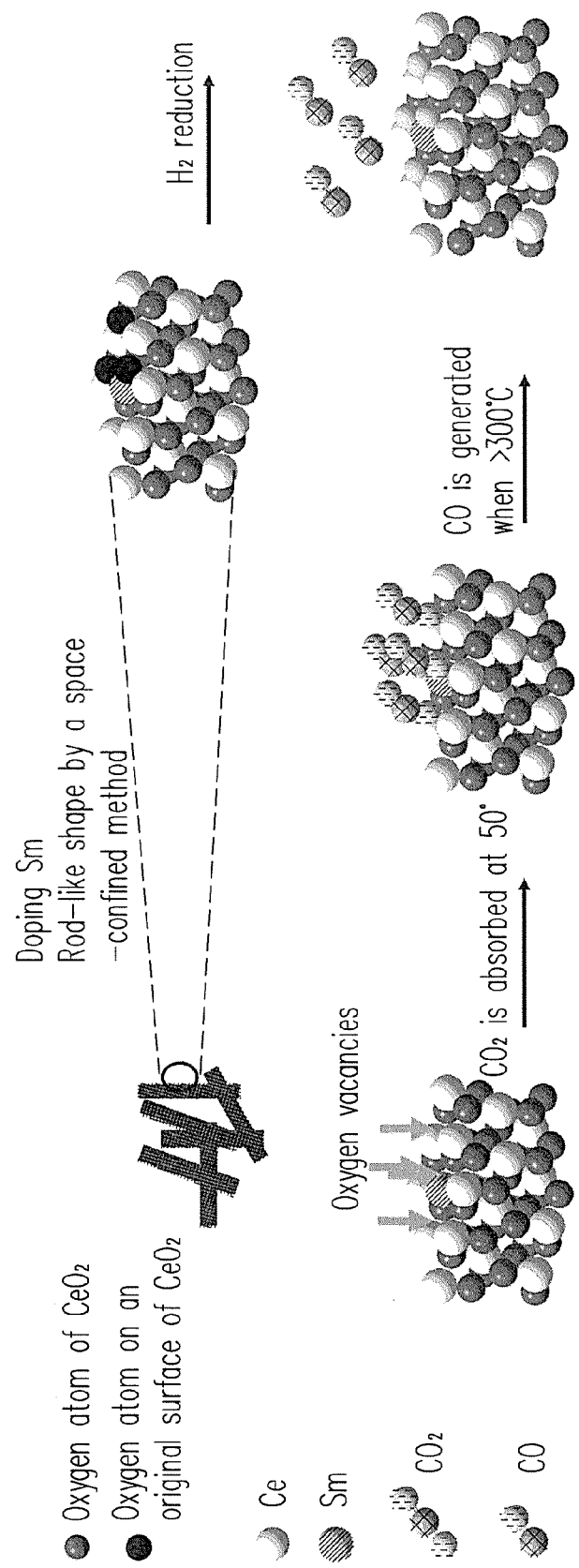
FIGS. 2A and 2B are schematic views illustrating mechanisms of adsorbing and converting carbon dioxide according to an embodiment of the invention.
Figure 2B:
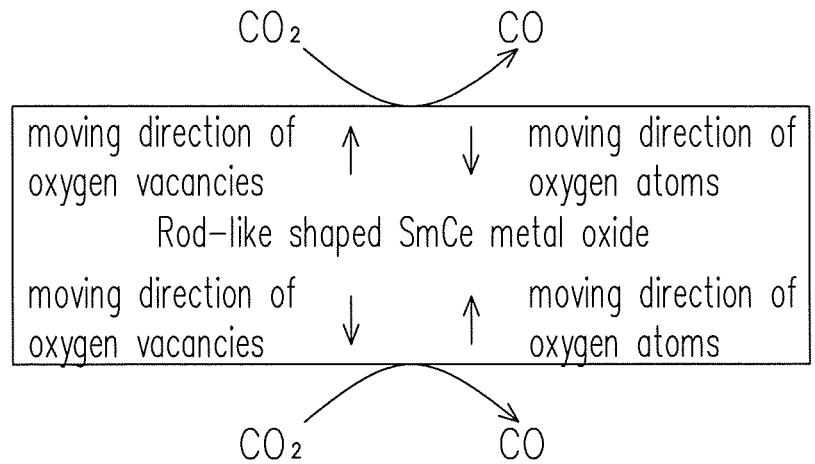
Figure 2C:
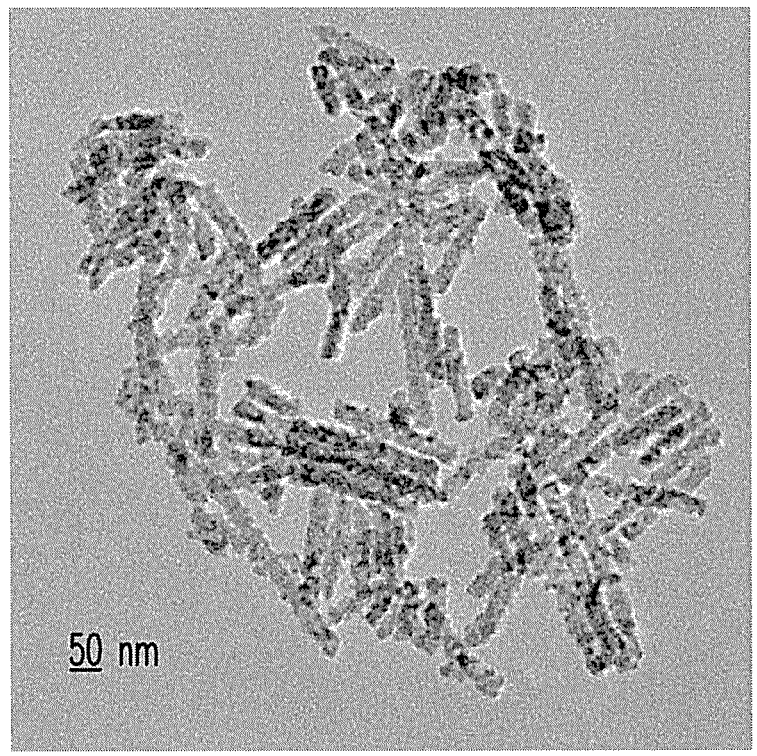
FIG. 2C is an electron microscope image of a ceramic material having a high specific surface area produced by a space-confined method according to an embodiment of the invention.

FIGS. 2A and 2B are schematic views illustrating mechanisms of adsorbing and converting carbon dioxide according to an embodiment of the invention. FIG. 2C is an electron microscope image of a ceramic material having a high specific surface area produced by a space-confined method according to an embodiment of the invention. The adsorbing mechanism and the converting mechanism of carbon dioxide according to an embodiment of the invention are illustrated below with reference of FIGS. 2A to 2C.

Referring to FIG. 2A, the ceramic material in the present embodiment is described by using Sm-doped $CeO_2$ as an example. As shown in FIG. 2A, after being processed by the space-confined method, a structure of the resulting SmCe metal oxide is presented in a rod-like shape with increased oxygen vacancies on the surface thereof. After performing the hydrogen reduction method, oxygen vacancies in SmCe metal oxide may be further increased. An actual structure of SmCe metal oxide is as shown in FIG. 2C. Afterwards, the temperature control process is performed, for example, by adsorbing carbon dioxide at 50° C., so that carbon dioxide molecules may be adsorbed by oxygen vacancies on the surface of the ceramic material. Next, if the temperature is further raised to 300° C. or more, a great amount of carbon monoxide molecules may be released from the ceramic material, that is, carbon dioxide molecules adsorbed by the ceramic material are converted to carbon monoxide molecules which then are released.

It should be noted that, the adsorbing mechanism and the converting mechanism of carbon dioxide according to the methods of the invention illustrated in FIG. 2A is only a simulation and an example by using a molecular structure model; however, oxygen vacancies are not in a stationary state from a microscale perspective. As shown in FIG. 2B, oxygen vacancies on the surface of the rod-like shaped SmCe metal oxide may adsorb carbon dioxide molecules, and the carbon dioxide molecules may then be converted to carbon monoxide molecules which then are released. Oxygen vacancies located on the surface of SmCe metal oxide are consumed and occupied by oxygen atoms. As a result, oxygen vacancies inside the SmCe metal oxide may diffuse towards the surface for conducting subsequent adsorption and conversion of Carbon dioxide, after carbon monoxide molecule has been released. Consequently, oxygen vacancies inside the SmCe metal oxide diffuse towards the surface and oxygen atoms appear to move in the opposite direction. In this case, oxygen vacancies inside SmCe metal oxide may all have chance to adsorb carbon dioxide and convert it into carbon monoxide.

In addition, for estimating the amount of oxygen vacancies, it is described herein by using a tetravalent metal oxide represented by formula $AO_2$ as an example. A form of the tetravalent metal oxide that has maximum oxygen vacancies is $AO_{1.5}$, and if the metal oxide without oxygen vacancies is 1 mol, the maximum amount of oxygen vacancies thereof is approximately 0.5 mol. For example, a form of $CeO_2$ with maximum oxygen vacancies is $CeO_{1.5}$, in which 0.5 mol of oxygen atoms reduced is equivalent to an amount of oxygen vacancies generated, so that the maximum oxygen vacancies in each gram of $CeO_2$ is approximately $1/172.12*0.5=2905$ μmol/g, and since $CO_2$ is mainly adsorbed by the surface of the ceramic material, an actual value of the amount of $CO_2$ adsorbed would be lower than its theoretical value. When doping is further performed on the metal oxide, such as doping Sm into $CeO_2$, to form $Sm_{0.2}Ce_{0.8}O_{1.9}$, which has 0.1 mol of oxygen vacancies, that is, an amount of oxygen vacancies thereof is $1/172.12*0.1=581$ μmol/g.

However, the value of maximum oxygen vacancies as stated above is only a theoretical calculation, practically what really contribute to the process of converting $CO_2$ into CO are diffusible oxygen vacancies, whereas not diffusible oxygen vacancies do not contribute to the process of converting $CO_2$ into CO. Since doping and conducting a temperature control process may contribute to the mobility of oxygen vacancies, the conversion of $CO_2$ may also be facilitated thereby. In addition, methods for testing an amount of diffusible oxygen vacancies includes converting an amount of CO being generated, that is, estimating an amount of diffusible oxygen vacancies by adapting a principle of "one CO molecular may be generated by filling one oxygen atom of $CO_2$ into one oxygen vacancy of the metal oxide". For instance, at a reaction temperature of 600° C., an amount of movable oxygen vacancies in $Sm_{0.2}Ce_{0.8}O_{1.9}$ is approximately 204 μmol/g, whereas an amount of diffusible oxygen vacancies in $CeO_2$ is approximately 22.8 μmol/g. Accordingly, it is confirmed that doping may indeed increase a mobility of oxygen vacancies.

Experiments 1 to 4 are provided below to further describe the embodiments of the invention. Note that the data and results in the following experiments are simply served to explain test results of materials used in the embodiments of the invention after performing various processes and experiments thereon, and should not be construed as a limitation to the scope of the invention.

It should also be noted that after $CeO_2$ is processed by the space-confined method, some oxygen vacancies may be generated in $CeO_2$, so that a structure close to $CeO_{1.98}$ may be produced. In addition, if $CeO_2$ is doped with Sm, a chemical structure close to $Sm_{0.2}Ce_{0.8}O_{1.9}$ may be formed as described above. For clearly indicating different forms of metal oxides in the following paragraphs, "SC—$CeO_2$" is used for representing $CeO_2$ processed by the space-confined method (which may have a chemical formula of approximately $CeO_{1.98}$ in reality), and "SC—$Sm_{0.2}Ce_{0.8}O_{1.9}$" is used for representing $CeO_2$ processed by both the space-confined method and Sm doping (which may have a chemical formula of approximately $Sm_{0.2}Ce_{0.8}CeO_x$ in reality, wherein x<2).

<Experiment 1>

Figure 3A:
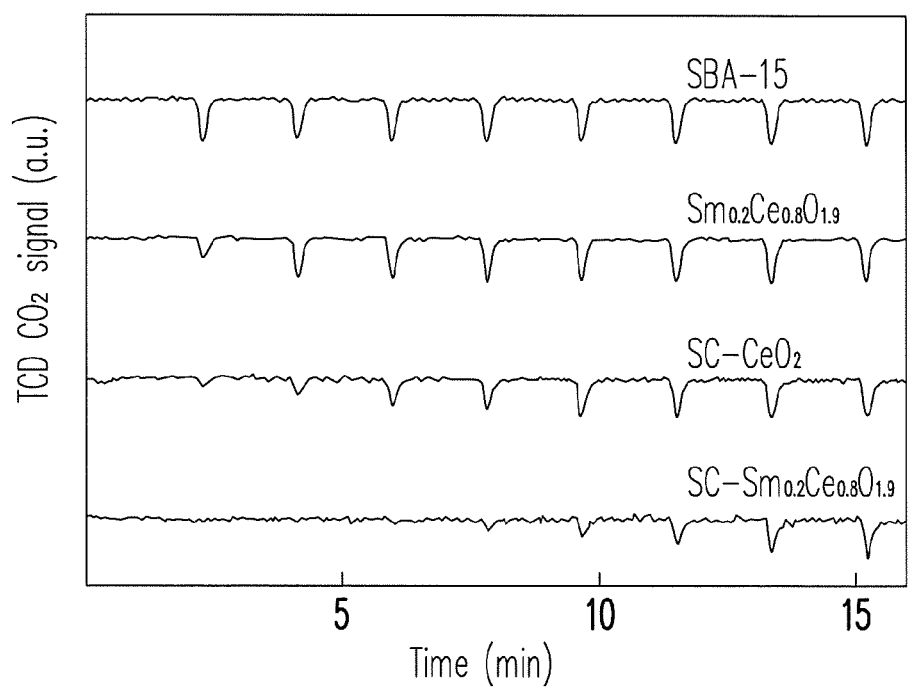
FIGS. 3A and 3B are analysis diagrams obtained by performing tests regarding the capability of a plurality of ceramic materials being processed differently to adsorb carbon dioxide according to an experimental example of the invention.
Figure 3B:
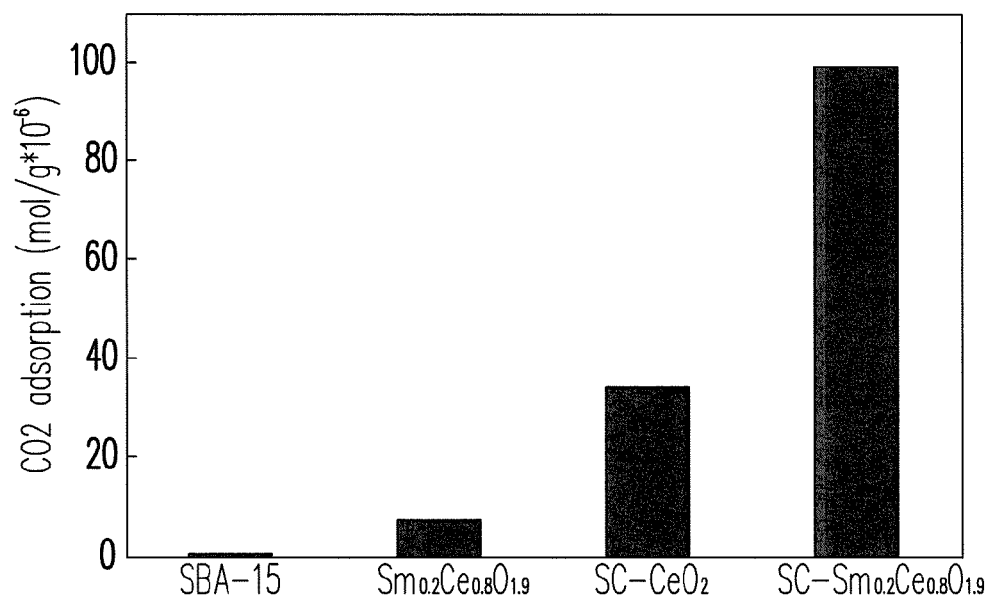

FIGS. 3A and 3B are analysis diagrams obtained by performing tests regarding the capability of a plurality of ceramic materials being processed differently to adsorb carbon dioxide. In the present experiment, firstly, four samples are provided, they are: SBA-15 (it can be synthesized by the following steps: dissolving 4 grams of a surfactant (P123) in 120 ml of 2N HCl with sufficient stirring, adding 30 ml of deionized water and 8.5 g of TEOS at 35° C. and stirring for 20 hours; after that, maintaining its temperature in a 100° C. oven for 24 hours, then washing it with a large amount of deionized water and conducting a suction filtration; lastly, the resultant is placed in a 80° C. oven and dried for 8 hours, then being sintered in the air at a temperature of 550° C. for 6 hours to obtained SBA-15), SmCe metal oxide without being processed by the space-confined method, Ce metal oxide processed by the space-confined method and SmCe metal oxide processed by the space-confined method. As described above, the space-confined method makes use of the principle of capillarity for filling a porous silicon material with a metal precursor in molten state, performing a sintering process on the metal precursor filled in the pores of the porous silicon material under high temperature, and removing the porous silicon material by an alkaline solution.

In the present experiment, steps of performing the space-confined method are as below: First, fetching 1.59 g of Ce nitrate and 0.41 g of Sm nitrate then mixing them with a solvent (e.g., water) until it is completely dissolved. Next, after draining the solution dry with a vacuum pump, fetching and mixing 3 g of SBA-15 thereto; heating a compound obtained from above steps to 800° C. with a heating rate of 1° C./min; removing SBA-15 by using NaOH after a cooling process; washing NaOH off with water; and performing a drying process and a weighing process. As a result, SmCe metal oxide processed by the space-confined method is then obtained. By respectively measuring specific surface areas of SmCe metal oxide processed by the space-confined method and SmCe metal oxide without being processed by the space-confined method, it could be obtained that the specific surface area of SmCe metal oxide processed by the space-confined method is 5.3 $m^2$/g, whereas the specific surface area of SmCe metal oxide without being processed by the space-confined method is 118 $m^2$/g. Next, performing the following processes respectively to each of the samples: placing the sample in a reaction chamber; heating the sample from a room temperature to 600° C. in a heating rate of 7° C./min under an environment of 10% $H_2$ (90% Ar). Afterwards, cooling the sample to 50° C., and stabilizing a thermal conductivity detector (TCD). Next, introducing $CO_2$ with a concentration of 10% (90% He) by one pulse every 2 minutes to allow the sample to adsorb $CO_2$; collecting gases at an exit of the reaction chamber; analyzing data measured by the TCD to detect a content of carbon dioxide in the reaction chamber. In the case where $CO_2$ is adsorbed by the sample, the TCD presents no signal or a weak signal; in the case where $CO_2$ is not adsorbed by the sample, the TCD presents a stable signal.

The experimental conditions of the gas phase chromatography are as below:

Sample weight: 0.05 g
Loop volume: 025 ml
Capture temperature: 50° C.

The results are shown in FIG. 3A. In FIG. 3A, the four samples from top to bottom are respectively: SBA-15, SmCe metal oxide without being processed by the space-confined method (illustrated as $Sm_{0.2}Ce_{0.8}O_{1.9}$ in the drawing), undoped Ce metal oxide processed by the space-confined method (illustrated as SC—$CeO_2$ in the drawing) and SmCe metal oxide processed by the space-confined method (illustrated as SC—$Sm_{0.2}Ce_{0.8}O_{1.9}$ in the drawing).

It can be known from FIG. 3A that under said experimental conditions, SBA-15 has no adsorbing effect to carbon dioxide, and SmCe metal oxide without being processed by the space-confined method ($Sm_{0.2}Ce_{0.8}O_{1.9}$) adsorbs only a few amount of carbon dioxide; however, it reaches saturation soon after the second pulse and is unable to perform any further adsorption. In addition, Ce metal oxide having only the specific surface area increased by the space-confined method without doping with Sm(SC—$CeO_2$) may also have a capability of adsorbing carbon dioxide, and said Ce metal oxide may continue to adsorb carbon dioxide until it reaches saturation after the fifth pulse. SmCe metal oxide processed by the space-confined method (SC—$Sm_{0.2}Ce_{0.8}O_{1.9}$) has the best adsorbing effect among four samples, and it gradually stops to adsorb carbon dioxide after the eighth pulse. FIG. 3B is a diagram quantizing the results as shown above, the detailed data thereof is shown in Table 1 below.

TABLE 1

|  | XRD grain size (nm) | BET surface area (m²/g) | $CO_2$ adsorption capacity (μmol/g) |
|---|---|---|---|
| SBA-15 | N.A. | 805 | 0.5 |
| $Sm_{0.2}Ce_{0.8}O_{1.9}$ | 52 | 5.3 | 7.2 |
| SC-$CeO_2$ | 8 | 121 | 33.8 |
| SC-$Sm_{0.2}Ce_{0.8}O_{1.9}$ | 8 | 118 | 99.1 |

In view of Table 1, it is obvious to know differences in the capability of adsorbing carbon dioxide between the four samples. Despite that the surface area of SBA-15 is as high as 805 m²/g, SBA-15 only has a small amount of oxygen vacancies; therefore, the adsorption of carbon dioxide thereof may not be effectively performed.

In addition, performing the space-confined method may avoid the dopant and the metal oxide from being sintered under high temperature, thus a solid metal oxide having a high specific surface area may be synthesized accordingly. As a result, in Table 1, comparing SmCe metal oxide without being processed by the space-confined method ($Sm_{0.2}Ce_{0.8}O_{1.9}$) with SmCe metal oxide processed by the space-confined method (SC—$Sm_{0.2}Ce_{0.8}O_{1.9}$), it can be known that once processed by the space-confined method, the metal oxide may obtain a better capability of adsorbing carbon dioxide. In addition, in Table 1, comparing undoped Ce metal oxide (SC—$CeO_2$) with doped SmCe metal oxide (SC—$Sm_{0.2}Ce_{0.8}O_{1.9}$), both are processed by the space-confined method, it can be known that oxygen vacancies of Ce metal oxide may be increased by doping with Sm, so as to enhance the capability of Ce metal oxide to adsorb carbon dioxide.

It can be known from the above experiment that either performing the space-confined method or doping with a dopant may enhance the capability of Ce metal oxide to adsorb carbon dioxide. Particularly, the capability of Ce metal oxide to adsorb carbon dioxide may be greatly enhanced when using the two methods concurrently.

<Experiment 2>

Figure 4:
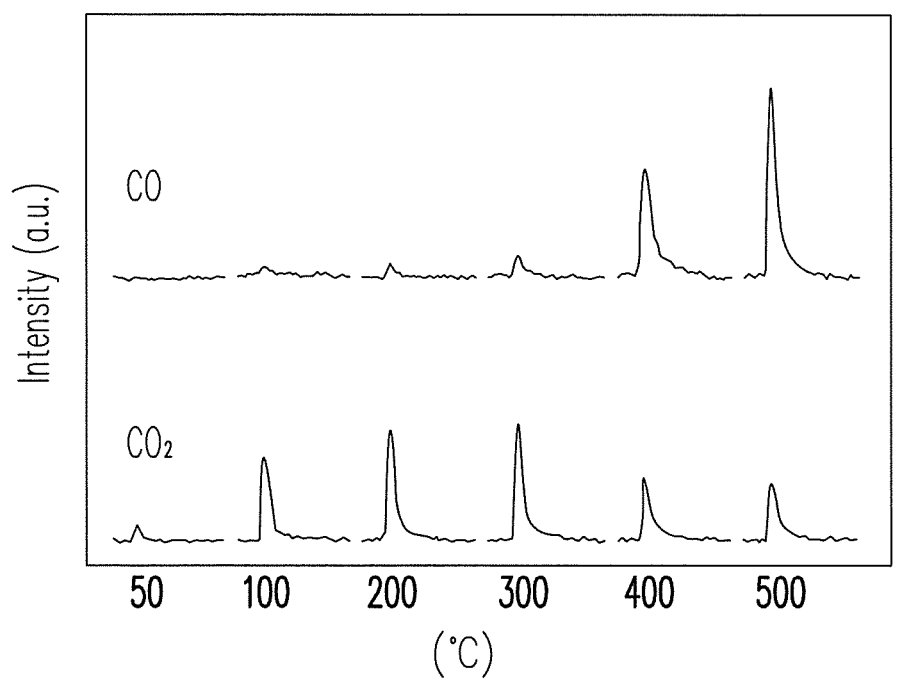
FIG. 4 is a diagram of relations between temperatures and amounts of carbon dioxide and carbon monoxide measured in a reaction chamber according to an experimental example of the invention.

FIG. 4 is a diagram of relations between temperatures and amounts of carbon dioxide and carbon monoxide measured in a reaction chamber according to an experimental example of the invention. In the present experiment, SmCe metal oxide processed by the space-confined method (SC—$Sm_{0.2}Ce_{0.8}O_{1.9}$) is used as a sample for conducting a carbon dioxide adsorption experiment. First, under an environment of 10% $H_2$ (90% Ar), the sample is placed in a reaction chamber; and is heated from room temperature to 600° C. with a heating rate of 7° C./min. Next, cooling the sample to a temperature of 50° C., and waiting for a mass analyzer (MS) to stabilize. Then, respectively introducing $CO_2$ by a pulse method under different temperature conditions (50° C., 100° C., 200° C., 300° C., 400° C., 500° C.), so as to allow the sample to continuously adsorb $CO_2$, and collecting gases at an exit of the reaction chamber. The amount of carbon dioxide adsorbed and a signal strength of carbon monoxide generated are analyzed by MS. The pulse method for sample introduction includes the following steps: introducing a certain amount of $CO_2$ with a concentration of 100% under an environment with a temperature of 50° C. (first pulse sample introduction); raising the temperature to 100° C. and introducing $CO_2$ again (second-pulse sample introduction); and the rest can be done in the same manner until the temperature is raised to 500° C. Lastly, a sixth-pulse sample introduction is performed at 500° C., and the GC/MS data obtained is organized and analyzed.

In this experiment, the experimental conditions for the GC/MS is as below:

Sample weight: 0.1 g

Loop volume: 0.25 ml

The results are as shown in FIG. 4. Adsorption of carbon dioxide can be observed respectively at 50° C., 100° C., 200° C., 300° C. In said temperature range, after each sample introduction process is completed, an amount of carbon dioxide adsorbed by the sample is gradually decreased, which means that the amount of carbon dioxide adsorbed by the sample gradually approaches saturation. However, obvious generation of carbon monoxide is not observed. As shown in FIG. 4, a signal of carbon monoxide molecule is barely detectable in the temperature range, or only a small amount of carbon monoxide molecules are generated. However, it should be noted that, when the temperature is higher than 300° C., that is, in the case where the temperature reaches 400° C. and 500° C., the amount of carbon monoxide generated is greatly increased.

From this experiment, it can be known that when the reaction temperature is higher than 300° C., SmCe metal oxide have a more preferable efficiency in converting carbon dioxide into carbon monoxide. Practically, in consideration of the degradation temperature and stability of reactant, the reaction temperature is preferably in the range of 300° C. to 1000° C.

<Experiment 3>

Figure 5A:
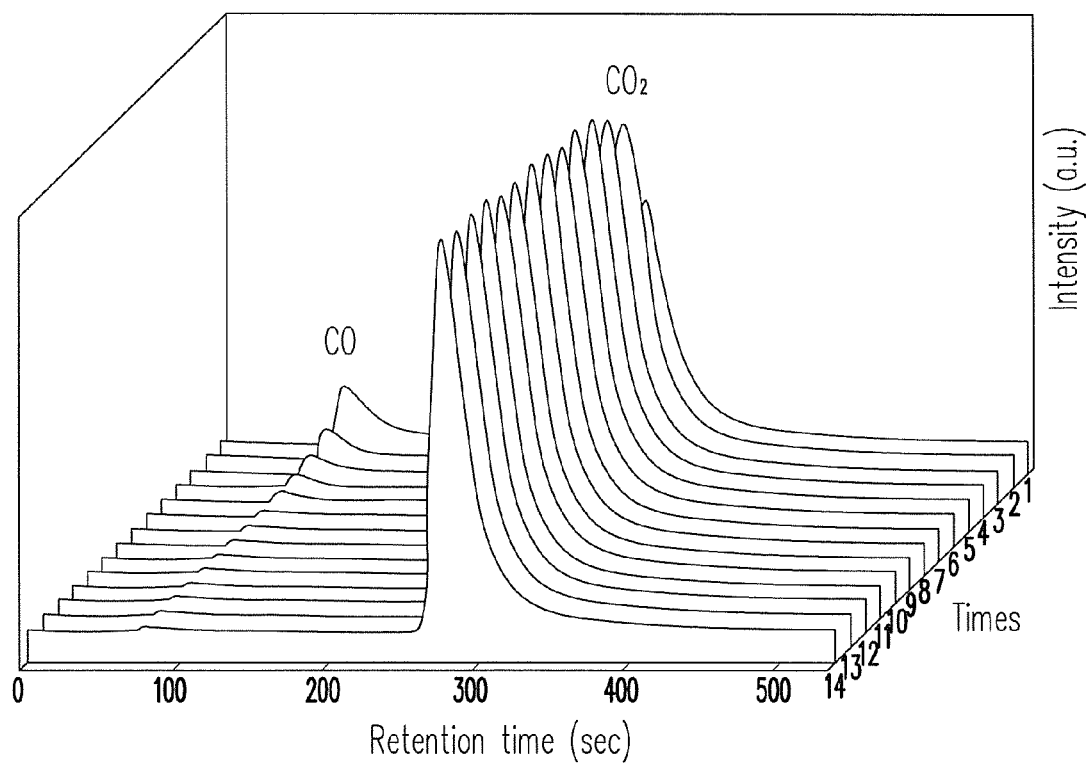
FIG. 5A and FIG. 5B are gas phase chromatograms obtained by performing experiments of adsorbing and converting carbon dioxide respectively on Ce metal oxide not doped with Sm ion (SC—$CeO_2$) and Ce metal oxide doped with Sm ion (SC—$Sm_{0.2}Ce_{0.8}O_{1.9}$).
Figure 5B:
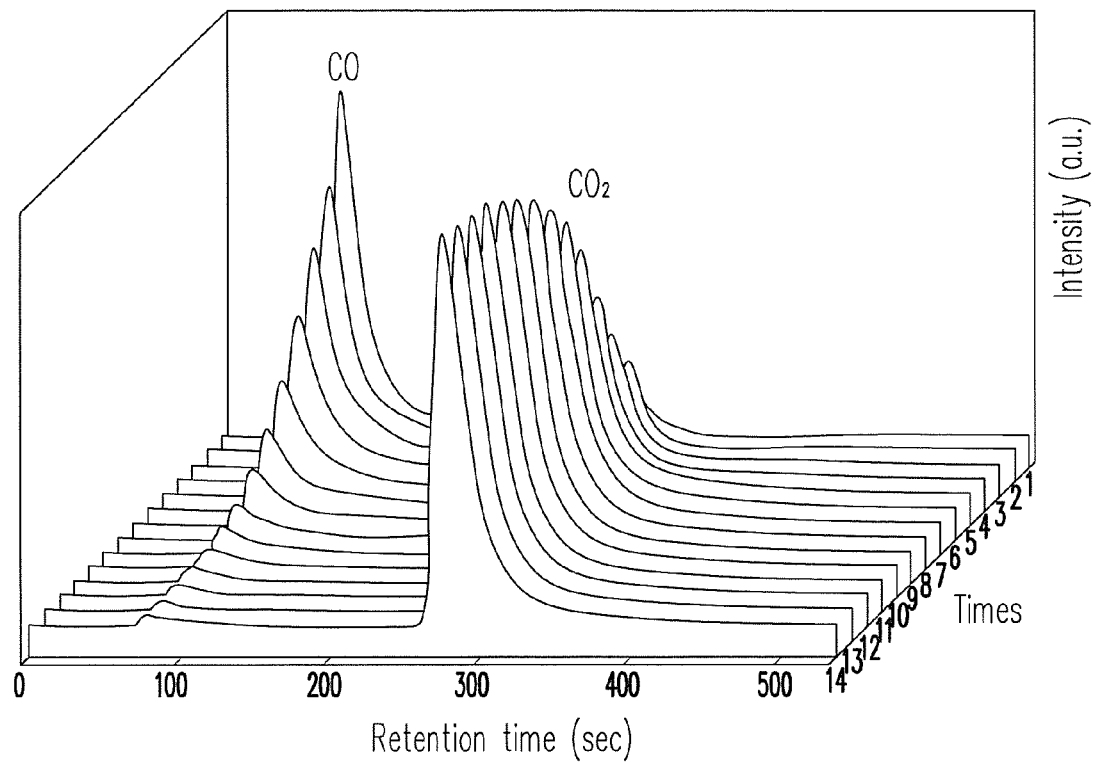

FIG. 5A and FIG. 5B are gas phase chromatograms obtained by performing experiments of adsorbing and converting carbon dioxide respectively on Ce metal oxide not doped with Sm ion (SC—$CeO_2$) and Ce metal oxide doped with Sm ion (SC—$Sm_{0.2}Ce_{0.8}O_{1.9}$). Before performing the experiment of adsorbing and converting carbon dioxide, each of the samples has been processed by the space-confined method. In the present experiment, the following processes are performed on SmCe metal oxide not doped with Sm ion (SC—$CeO_2$) and Ce metal oxide doped with Sm ion (SC—$Sm_{0.2}Ce_{0.8}O_{1.9}$). First, placing a sample in a reaction chamber, heating the sample from room temperature to 600° C. in a heating rate of 7° C./min under an environment of 10% $H_2$ (90% Ar). Next, cooling the sample to 500° C.; introducing a certain amount of $CO_2$ with a concentration of 100% using a pulse method for a plurality of times (e.g., in the present experiment is exemplified with 14 times) after a Pulsed Discharge Helium Ionization Detector (PDHID) is stabilized, so as to allow the sample to adsorb $CO_2$; collecting gases at an exit of the reaction chamber; and confirming the status of carbon dioxide adsorption and an amount of carbon monoxide generated in the reaction chamber by GC/PDHID analysis. The amount of carbon monoxide generated may be obtained by integrating a peak indicating carbon monoxide in the chromatogram.

The experimental conditions of the gas phase chromatography is as below:

Sample weight: 0.1 g

Loop volume: 0.125 ml

The results are as shown in FIG. 5A and FIG. 5B, after continuously introducing the same amount of carbon dioxide respectively to SC—$CeO_2$ and SC—$Sm_{0.2}Ce_{0.8}O_{1.9}$ at 500° C. for a number of times, it is found that both of which are capable of adsorbing $CO_2$. However, SC—$CeO_2$ has a weaker capability of adsorbing carbon dioxide. After introducing $CO_2$ therein for the first time to adsorb a small amount of $CO_2$ and generate a small amount of CO, adsorption capacity of SC—$CeO_2$ is almost saturated. In contrast, SC—$Sm_{0.2}Ce_{0.8}O_{1.9}$ has a stronger capability of adsorbing $CO_2$, and an adsorption of $CO_2$ may be observed in operations from the first to the seventh introduction of $CO_2$, while having a strong signal of CO. This indicates that SC—$Sm_{0.2}Ce_{0.8}O_{1.9}$ has a fast conversion rate and may quickly converting $CO_2$ into CO which then is released. Once the adsorption is saturated, the amount of CO generated is also reduced accordingly. In addition, as shown in the results obtained from integrating the peak indicating carbon monoxide in the chromatogram, a capability of SC—$CeO_2$ to generate CO is 22.8 μmol/g, while a capability of SC—$Sm_{0.2}Ce_{0.8}O_{1.9}$ to generate CO is 204 μmol/g, which is more preferable. As a result, the present experiment has proved that capabilities of adsorbing and converting carbon dioxide may also be significantly enhanced by doping Ce metal oxide with Sm ions under a high temperature environment of 500° C.

<Experiment 4>

Figure 6:
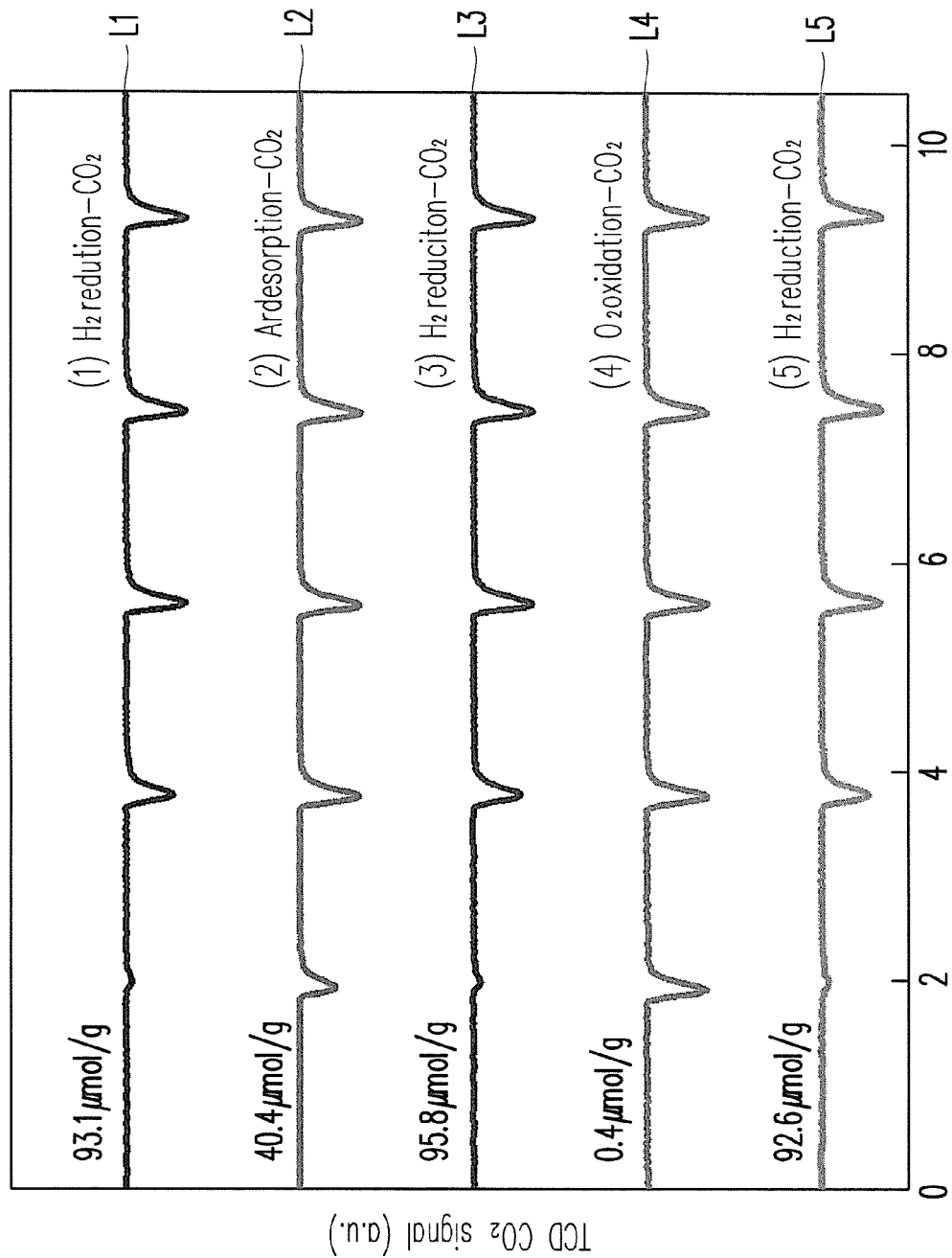
FIG. 6 is a result diagram obtained by GC/TCD analysis after an experiment of oxygen vacancies reduction is performed on Ce metal oxide doped with Sm ion (SC—$Sm_{0.2}Ce_{0.8}O_{1.9}$).

FIG. 6 is a result diagram obtained by TCD analysis after an experiment of oxygen vacancies reduction is performed on Ce metal oxide doped with Sm ion (SC—$Sm_{0.2}Ce_{0.8}O_{1.9}$). Before performing the experiment of adsorbing and converting carbon dioxide, each of the samples has been processed by the space-confined method.

Referring to FIG. 6, in the present experiment, a same sample of SmCe metal oxide (SC—$Sm_{0.2}Ce_{0.8}O_{1.9}$) is used for testing oxygen vacancy reduction. The sample used is 0.1 g and the loop volume thereof is 0.25 ml. Curves 1 to 5 in FIG. 6 are results obtained by TCD analysis after performing the experiment of adsorbing and converting carbon dioxide on the sample processed by the following steps (1) to (5). Experiment processes of steps (1) to (5) are as below.

Step (1): First, placing a sample in a reaction chamber, heating the sample from room temperature to 600° C. in a heating rate of 7° C./min under an environment of 10% $H_2$ (90% Ar). Next, cooling the sample to a temperature of 500° C.; introducing a certain amount of $CO_2$ with a concentration of 100% by using a pulse method (once per every 2 minutes) after the TCD is stabilized, so as to allow the sample to adsorb $CO_2$; collecting gases at an exit of the reaction chamber; and confirming the status of carbon dioxide adsorption and an amount of carbon monoxide generated in the reaction chamber by TCD analysis. The result obtained by TCD analysis is presented in curve L1 in FIG. 6.

Step (2): after step (1), the sample is processed by Ar with a concentration of 100%, and is heated from room temperature to 600° C. in a heating rate of 7° C./min. Next, cooling the sample to 500° C.; introducing a certain amount of $CO_2$ with a concentration of 100% by a pulse method (once per every 2 minutes) after the TCD is stabilized, so as to allow the sample to adsorb $CO_2$; collecting gases at an exit of the reaction chamber; and confirming the status of carbon dioxide adsorption and an amount of the carbon monoxide generated in the reaction chamber by TCD analysis. The result obtained by TCD analysis is presented in curve L2 in FIG. 6.

Step (3): after step (2), the sample is further processed by $H_2$ with a concentration of 10% and is heated from room temperature to 600° C. in a heating rate of 7° C./min. Next, cooling the sample to 50° C.; introducing a certain amount of $CO_2$ with a concentration of 100% by a pulse method (once per every 2 minutes) after the TCD is stabilized, so as to allow the sample to perform adsorb $CO_2$; collecting gases at an exit of the reaction chamber; and confirming the status of carbon dioxide adsorption and an amount of the carbon monoxide generated in the reaction chamber by TCD analysis. The result obtained by TCD analysis is presented in curve L3 in FIG. 6.

Step (4): after step (3), the sample is processed by $O_2$ with a concentration of 5% (95% He) again and is heated from room temperature to 600° C. in a heating rate of 7° C./min. Next, cooling the sample to 50° C.; introducing a certain amount of $CO_2$ with a concentration of 100% by a pulse method (once per every 2 minutes) after the TCD is stabilized, so as to allow the sample to adsorb $CO_2$; collecting gases at an exit of the reaction chamber; and confirming the status of carbon dioxide adsorption and an amount of the carbon monoxide generated in the reaction chamber by TCD analysis. The result obtained by TCD analysis is presented in curve L4 in FIG. 6.

Step (5): after step (4), the sample is processed by $H_2$ with a concentration of 10% and is heated from room temperature to 600° C. in a heating rate of 7° C./min. Next, cooling the sample to 50° C.; introducing a certain amount of $CO_2$ with a concentration of 100% by a pulse method (once per every 2 minutes) after the TCD is stabilized, so as to allow the sample to adsorb $CO_2$; collecting gases at an exit of the reaction chamber; and confirming the status of carbon dioxide adsorption and an amount of the carbon monoxide generated in the reaction chamber by TCD analysis. The result obtained by TCD analysis is presented in curve L5 in FIG. 6.

Please refer to the results shown in FIG. 6. First, after introducing hydrogen gas for processing the sample, $CO_2$ is further introduced for conducting an adsorption test. As shown by curve L1, a first peak on the left side is almost disappeared, this indicates that the sample has a capability of adsorbing $CO_2$ (with an approximate adsorption capacity of 93.1 μmol/g SC—$Sm_{0.2}Ce_{0.8}O_{1.9}$). Next, performing an Ar treatment in order to reduce oxygen vacancies by Ar for a period of time; then introducing $CO_2$ to conduct the adsorption test. The result is as shown by curve L2, in which only a portion of $CO_2$ is adsorbed by the sample (with an approximate adsorption capacity of 40.4 μmol/g SC—$Sm_{0.2}Ce_{0.8}O_{1.9}$). It can be deduced that in a stage from the steps of adsorbing $CO_2$, (represented by curved L1) to Ar desorption (represented by curve 2), the adsorbed $CO_2$ has been converted into CO under high temperature, such that the sample does not have enough oxygen vacancies for adsorbing $CO_2$. Therefore, the adsorption capacity of $CO_2$ as shown in curve L2 is smaller than that of curve L1.

Next, a reduction process is performed on the sample by introducing hydrogen gas again, followed by introducing $CO_2$ for another adsorption test. The result is as shown by curve L3, the sample can recover the capability of adsorbing $CO_2$ as that shown by curve L1 (with an approximate adsorption capacity of 95.8 μmol/g SC—$Sm_{0.2}Ce_{0.8}O_{1.9}$). Therefore, the sample has a regenerating capability according to curve L1 and curve L3. After that, in order to confirm whether the adsorption of carbon dioxide is performed by oxygen vacancies, oxygen is introduced into the sample to provide sufficient oxidation, followed by introducing $CO_2$ for another adsorption test. The result is as shown by curve L4, in which the sample merely has no effect on $CO_2$ adsorption (with an approximate adsorption capacity of 0.4 μmol/g SC—$Sm_{0.2}Ce_{0.8}O_{1.9}$). However, once the sample is processed by hydrogen, the capability of adsorbing $CO_2$ can be restored as shown by curve L5 (with an approximate adsorption capacity of 92.6 µmol/g SC—$Sm_{0.2}Ce_{0.8}O_{1.9}$).

In view of the above results, it can be confirmed that the capability of adsorbing $CO_2$ is obtained from oxygen vacancies in SmCe metal oxide. According to curve L1, curve L3 and curve L5, it also can be known that a favorable effect of oxygen vacancies reduction in SmCe metal oxide may be achieved by applying a thermal reduction method, thereby allowing the sample to have an outstanding regenerating capability.

In view of above, the ceramic material provided by the invention has favorable effects in adsorbing and/or converting carbon dioxide. Also, the method for adsorbing carbon dioxide provided by the invention may effectively adsorb carbon dioxide, so as to further reduce the content of carbon dioxide in the air. In addition, the method for converting carbon dioxide provided by the invention may be applied in industrial production for preparing various chemicals by using carbon monoxide obtained from the conversion of carbon dioxide. In addition, the ceramic material is a favorable catalyst, since it can be recycled and reused for adsorbing or converting carbon dioxide by a thermal reduction method.

What is claimed is:

1. A ceramic material of a chemical formula $M_{1x}M_{2y}O_z$, wherein $M_1$ is selected from a group consisting of Nd, Sm, Yb, Sc, Y, La, Ac, Ga, In, Tl, V, Nb, Ta, Fe, Co, Ni, Cu, Ca, Sr, Na, and Li; $M_2$ is selected from a group consisting of Ce, Zn, Ti, Zr and Si; O represents oxygen atom; $x<0.5$, $y>0.5$, $x+y=1.0$, $z<2.0$; and the ceramic material has an adsorption capacity of not less than 20 µmol/g for $CO_2$ at 50° C.

2. The ceramic material of claim 1, wherein the adsorption capacity for $CO_2$ at 50° C. is 20 to 99.1 µmol/g.

3. The ceramic material of claim 1, wherein a specific surface area of the ceramic material is 5 to 118 $m^2/g$.

* * * * *